(12) United States Patent
Weaver et al.

(10) Patent No.: US 8,484,200 B2
(45) Date of Patent: Jul. 9, 2013

(54) SYSTEM AND METHOD FOR THE CENTRALIZED MANAGEMENT OF A DOCUMENT ORDERING AND DELIVERY PROGRAM

(75) Inventors: Richard H. Weaver, Easton, CT (US); Fred Pandolfi, Chadds Ford, PA (US); Steve Hayes, North Granby, CT (US)

(73) Assignee: Infotrieve, Inc., Wilton, CT (US)

( * ) Notice: Subject to any disclaimer, the term of this patent is extended or adjusted under 35 U.S.C. 154(b) by 669 days.

(21) Appl. No.: 12/353,085

(22) Filed: Jan. 13, 2009

(65) Prior Publication Data

US 2010/0185676 A1    Jul. 22, 2010

(51) Int. Cl.
*G06F 7/02*    (2006.01)

(52) U.S. Cl.
USPC .......................................... 707/723; 707/740

(58) Field of Classification Search
None
See application file for complete search history.

(56) References Cited

U.S. PATENT DOCUMENTS

| | | | |
|---|---|---|---|
| 5,765,152 A * | 6/1998 | Erickson | 1/1 |
| 5,802,515 A * | 9/1998 | Adar et al. | 707/723 |
| 5,832,499 A * | 11/1998 | Gustman | 707/740 |
| 6,253,193 B1 * | 6/2001 | Ginter et al. | 705/57 |
| 6,289,342 B1 * | 9/2001 | Lawrence et al. | 1/1 |
| 6,353,831 B1 * | 3/2002 | Gustman | 707/740 |
| 6,363,488 B1 * | 3/2002 | Ginter et al. | 726/1 |
| 6,389,402 B1 * | 5/2002 | Ginter et al. | 705/51 |
| 6,427,140 B1 * | 7/2002 | Ginter et al. | 705/80 |
| 6,738,780 B2 * | 5/2004 | Lawrence et al. | 707/722 |
| 6,957,193 B2 * | 10/2005 | Stefik et al. | 705/51 |
| 7,039,673 B1 * | 5/2006 | Abbott et al. | 709/203 |
| 7,386,599 B1 * | 6/2008 | Piersol et al. | 709/217 |
| 7,657,518 B2 * | 2/2010 | Budzik et al. | 707/723 |
| 7,725,499 B1 * | 5/2010 | von Lepel et al. | 707/803 |
| 7,792,818 B2 * | 9/2010 | Fain et al. | 707/710 |
| 7,849,100 B2 * | 12/2010 | Brown et al. | 707/783 |
| 7,971,150 B2 * | 6/2011 | Raskutti et al. | 715/764 |
| 2002/0156760 A1 * | 10/2002 | Lawrence et al. | 707/1 |
| 2005/0144469 A1 * | 6/2005 | Saitoh | 713/189 |
| 2006/0155695 A1 * | 7/2006 | Pyka | 707/4 |
| 2006/0200468 A1 * | 9/2006 | Brown et al. | 707/9 |
| 2007/0094352 A1 | 4/2007 | Choi et al. | |
| 2007/0289022 A1 * | 12/2007 | Wittkotter | 726/27 |
| 2008/0025493 A1 * | 1/2008 | Paras et al. | 379/265.12 |
| 2009/0112859 A1 * | 4/2009 | Dehlinger | 707/6 |
| 2009/0171905 A1 * | 7/2009 | Garcia | 707/3 |

(Continued)

OTHER PUBLICATIONS

"A JISC Project-Open Linking in a Virtual Learning Environment, (OLIVE) OLIVE Project Final Report", Bennett, et al., URL:http://www.jisc.ac.uk/ploaded documents/Olive Project Report.pdf (Jan. 30, 2004).

(Continued)

*Primary Examiner* — Hung Q Pham
*Assistant Examiner* — Hubert Cheung
(74) *Attorney, Agent, or Firm* — Lowenstein Sandler LLP

(57) ABSTRACT

A system and method for managing the ordering, maintenance, and delivery of documents (e.g., technical publications, journals, etc.) in a copyright-compliant manner. A company having a plurality of users having a significant need to order a large number of documents, may utilize the system and method to centrally manage the company's document ordering needs. The system and method provides for the end-to-end management of the entire document delivery supply chain from the publisher to the user. Use of the system and method enables a company to efficiently control the automated distribution of content in compliance with copyright restrictions set forth by document publishers.

24 Claims, 5 Drawing Sheets

U.S. PATENT DOCUMENTS

| | | | | |
|---|---|---|---|---|
| 2009/0292673 | A1* | 11/2009 | Carroll | 707/3 |
| 2010/0169304 | A1* | 7/2010 | Hendricksen et al. | 707/723 |
| 2011/0035402 | A1* | 2/2011 | Agrawal et al. | 707/769 |

OTHER PUBLICATIONS

"Reference Linking in a Hybrid Library Environment: Part 1: Frameworks for Linking", H. Van de Sompel et al., D-Lib Magazine, v. 5, n. 4 (Apr. 1999).

"Reference Linking in a Hybrid Library Environment: Part 2: SFX, A Generic Linking Solution", H. Van de Sompel et al., D-Lib Magazine, v. 5 n. 4 (Apr. 1999).

"Reference Linking in a Hybrid Library Environment: Part 3: Generalizing the SFX solution in the 'SFX@Ghent & SFX@LANL' experiment", H. Van de Sompel et al., D-Lib Magazine, v. 5, n. 10 (Oct. 1999).

"Open Linking in the Scholarly Information Environment Using the OpenURL Framework", H. Van de Sompel et al., D-Lib Magazine, v. 7, n. 3 (Mar. 2001).

"The OpenURL Framework for Context-Sensitive Services", National Information Standards Organization, NISO Press, Bethesda MD, ISBN: 1-880124-61-0 (2005).

"Why OpenURL?", A. Apps et al., D-Lib Magazine, v. 12, n. 5 (May 2006).

* cited by examiner

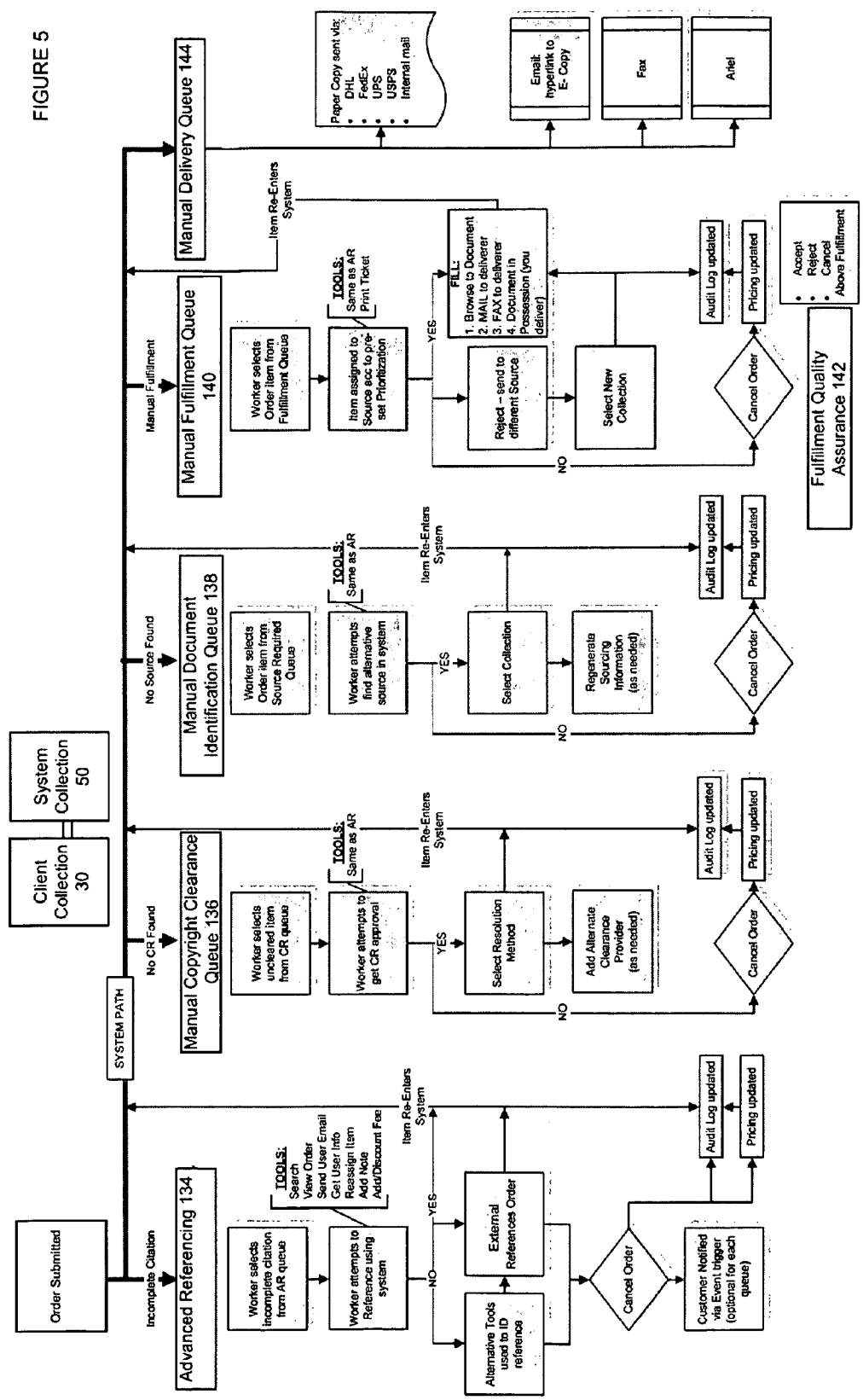

SYSTEM AND METHOD FOR THE CENTRALIZED MANAGEMENT OF A DOCUMENT ORDERING AND DELIVERY PROGRAM

FIELD OF THE INVENTION

The present invention relates generally to a document management system, and, more particularly, to a system and method for managing users access to and delivery of documents such as technical publications.

BACKGROUND OF THE INVENTION

Large and mid-sized companies, particularly those in science and technology industries, often have a great need to procure publications relating to the company's research and development efforts. Many of these companies have a large staff or company library dedicated to the identification of documents required by the company's researchers. The effort to obtain the desired documents is often expensive and plagued by a variety of inefficiencies.

A major drawback experienced by the in-house document retrieval model described above is the failure to comply with applicable copyright rights and regulations. Copyright-protected documents require a purchaser of the document to first obtain the appropriate copyright clearance and permissions from the document's publisher.

In conventional arrangements, in house library services frequently search for and identify desired documents on an ad hoc basis, failing to leverage inherent efficiencies in the copyright clearance and order fulfillment aspects of the process. Often, these types of systems lack a centralized management of documents which allows for the copyright-compliant reprinting of a document when faced with a later request of a previously ordered document.

Furthermore, the in-house staff and related systems are limited in their ability to identify documents which are not maintained in an internal repository and connect with the appropriate publisher or external source of documents.

An additional drawback to the existing ad hoc document management methods and systems present in the prior art is the natural barrier created in the distribution of research and development and technical documents to the researchers and scientists of the company. Specifically, by failing to efficiently track and manage previously requested documents and/or provide access to externally-available documents, the company fails to maximize the flow of information to the R&D staff, thus hampering the company's overall research and development efforts.

The above-described inefficiencies and lack of centralized management of the document control and delivery process results in conventional approaches to document management which are expensive to implement and manage. Therefore, there is a need for a method and a system for efficiently and effectively implementing, managing, administering, and monitoring a document management and delivery program.

SUMMARY OF THE INVENTION

The above-described problems are addressed and a technical solution is achieved in the art by systems and methods for managing a content supply chain to facilitate the tracking, ordering and delivery of documents to a plurality of users. According to an embodiment of the present invention, the systems and methods of the present invention provide an efficient framework for the control of copyrighted material, in accordance with applicable copyrights to ensure a user has the appropriate permission to access the copyrighted material. According to embodiments of the present invention, the users (i.e., employees, contractors, agents, or the like) associated with a client (i.e., an entity, company, corporation, organization, group, or the like) are provided with access to the "document management system" and related methods. The document management system of the present invention provides for the end-to-end management of the supply chain of documents provided by a publisher to and including delivery of the documents to the one or more users. Advantageously, the document management system provides a computer-executable software and processing system configured to bring together, in one comprehensive computing package capable of performing a variety of document management related functions, including, but not limited to: document procurement optimization, document licensing management, copyright compliance, usage monitoring and analysis, document repository management and document delivery.

The document management system includes a number of modules and/or components to systematically manage a user's rights to content sets or subsets, workflow processes to manage manual tasks, and document delivery (internally or externally copyright cleared and sourced). According to an embodiment of the present invention, the document management system supports the client in ensuring copyright compliance and provides detailed audit trails and data to support the client's copyright clearance efforts. The document management system is a transaction-based system that manages the users' access and usage of both internally-held documents (i.e., documents previously obtained from a publisher, typically in accordance with a contract with said publisher) and externally-held documents (i.e., document which may be retrieved from resources accessible by the document management system or documents maintained in collection provided by the document management system).

Advantageously, the document management system allows users to efficiently obtain high quality, cost-effective documents that can be delivered by the system in an automated fashion, all while maintaining copyright compliance. According to an embodiment of the present invention, the document management system creates a client collection comprising a plurality of internally-held documents. These internally-held documents are each associated with usage rights in accordance with the applicable publisher contract governing use of the internally-held document. The internally-held documents are further associated with access rights in accordance with client-directed access rights governing access to the internally-held document. As such, a repository of internally-held documents (i.e., the client collection) is created which includes robust and multi-layered data for each internally-held document in the client collection to enable the client to efficiently manage the licensing, usage, and copyright-compliance aspects associated with each document.

The document management system is further configured to receive an order for a requested document from the user. According to an embodiment of the present invention, the document management system performs a review of the client collection in order to determine if the requested document is available. In this regard, an objective of the document management system is to first attempt to fully leverage a client's licensed documents. If the requested document is not part of the client collection (i.e., the licensed documents) or is part of the collection but does not have the appropriate rights associated with it, the document management system is configured to search a collection of externally-held documents maintained by the system (i.e., the system collection).

Following identification of the requested document, the document management system verifies compliance with the usage rights and the access rights associated with the requested document and the user that originated the request. Upon verification of compliance with the applicable usage and/or access and delivers the requested document to the user.

According to an embodiment of the present invention, in the event that the order is fulfilled using the system collection, the document management system is configured to determine the applicable copyright or license fee that will be charged to the user and/or determine an excepted delivery date for the document, prior to acceptance of the order by user. According to an embodiment of the present invention, the document management system may comprise a cross-referencing/verification subsystem and may be configured to support a general citation parser for single or multiple ordering via 'Order by Citation' methodology.

According to an embodiment of the present invention, the cross-referencing/verification subsystem is configured to execute an algorithm designed to match user-provided citation data points to known citations stored by the document management system. Advantageously, the ranking algorithm not only considers matches between supplied data points and known citations but also mismatches. In operation, a user may input any number of data points upon which the citation search is based. The referencing/verification subsystem assigns a weight to each of the data points and resulting matches are ranked by how well the provided data points match to known citations. A base rank is calculated by determining the percentage of "core" user-provided datapoints (a certain subset of datapoints considered most important to a proper match) that match to a known citation. This base ranking is then enhanced by increasing and/or decreasing the ranking based on the matching/mismatching of addition non-core user-provided data points.

Following delivery of a requested document retrieved from the externally-held collection, the requested document many be added to the client collection for future use by the client. Advantageously, the document management system of the present application provides a centralized framework for the effective management, control and distribution of copyright compliance documents to a plurality of users associated with a client.

BRIEF DESCRIPTION OF THE DRAWINGS

The present invention will be more readily understood from the detailed description of exemplary embodiments presented below considered in conjunction with the attached drawings, of which:

FIG. 5 illustrates optional workflow management queues, according to one or more embodiments of the present invention.

It is to be understood that the attached drawings are for purposes of illustrating the concepts of the invention and may not be to scale.

DETAILED DESCRIPTION OF THE INVENTION

Figure 1:
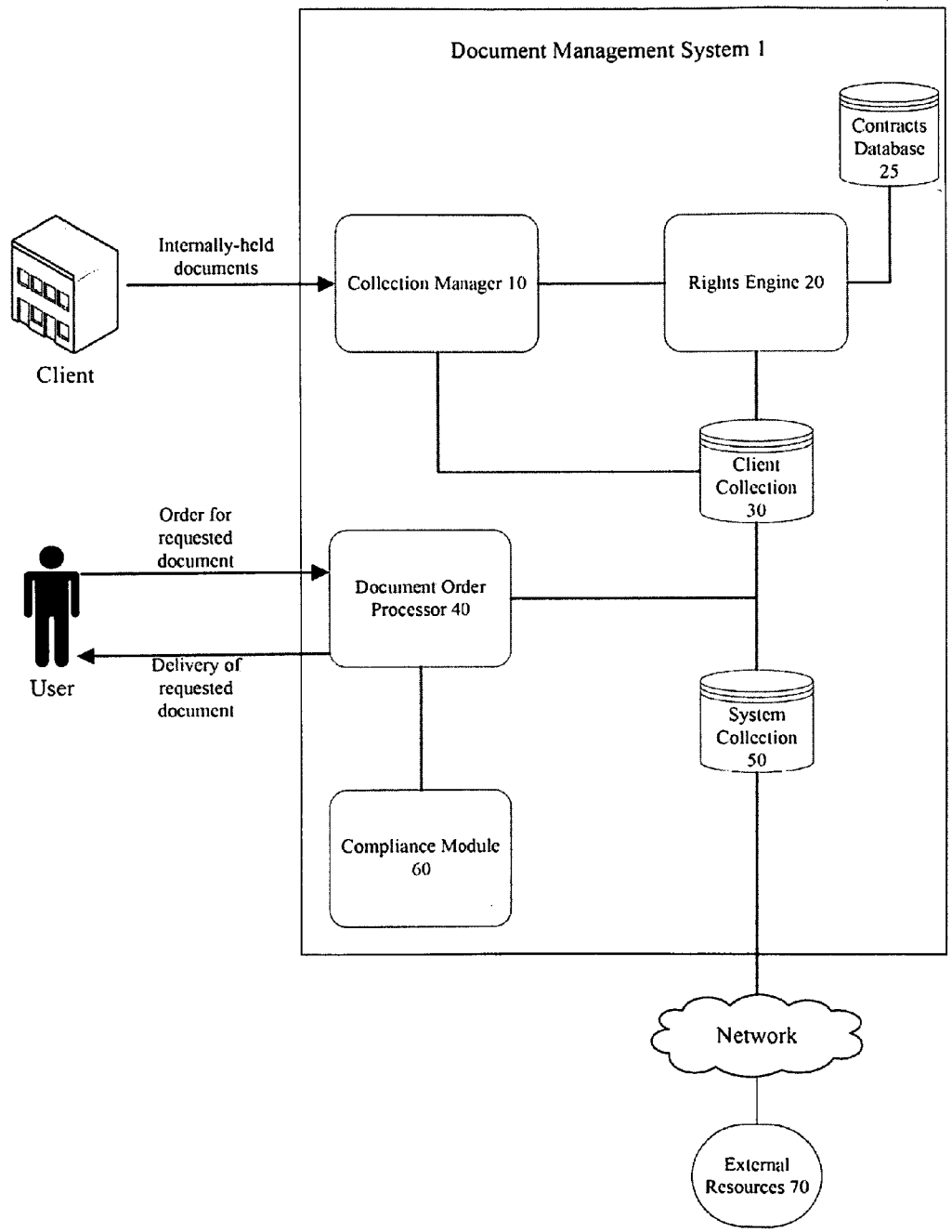
FIG. 1 is an illustration of a document management system, according to an one or more embodiments of the present invention.

The present invention relates to a method and a system for managing a document ordering program. FIG. 1 depicts a Document Management System 1 according to embodiments of the present invention. As used herein, the term 'document' is intended to include, but is not limited to, any article, publication, journal, book, proceeding, patent, patent publication, newsletter, and paper, in hard-copy and/or electronic format. The Document Management System 1 is a computer-based system, accessible by one or more 'users' associated with a client (i.e., a company) which has been granted the necessary authorization and access to the Document Management System 1. As used herein, the term 'user' is intended to include, but is not limited to, any employee, agent, contractor, or computer associated with the client. As used herein, the term 'client' is intended to include, but is not limited to, a company, corporate, entity, organization, or the like, and the related computing environment configured to include and/or have access to the Document Management System 1. The term 'computer' is intended to include any data processing device, such as a desktop computer, a laptop computer, a mainframe computer, a personal digital assistant, a server, a handheld device, or any other device configured to process data. The term 'computer module' is intended to include, but is not limited to, one or more computers configured to execute one or more software programs configured to perform one or more functions.

As shown in FIG. 1, the Document Management System 1 includes, but is not limited to, the following components: a Collection Manager 10, a Rights Engine 20, a Contracts Database 25, a Client Collection 30, a Document Order Processor 40, a System Collection 50 and a Compliance Module 60. The aforementioned components of the Document Management System 1 represent computer-implemented hardware and software modules configured to perform the functions described in detail below. One having ordinary skill in the art will appreciate that the components of the Document Management System 1 may be implemented on one or more communicatively connected computers. The term 'communicatively connected' is intended to include, but is not limited to, any type of connection, whether wired or wireless, in which data may be communicated, including, for example, a connection between devices and/or programs within a single computer or between devices and/or programs on separate computers. According to an embodiment of the present invention, the components of the Document Management System 1 may each be a computer module particularly configured to perform the function associated with the respective component.

The features and functionality of the Document Management System 1 and its components are described in detail in connection with the system diagram of FIG. 1 and the process flow diagram of FIG. 2. One having ordinary skill in the art will appreciate that the labeling of the steps illustrated in FIG. 2 (i.e., Step A, Step B, Step C, etc.) is for reference purposes only, and does not necessarily represent the order in which the steps take place. For example, Step A and Step B represents steps that may be performed iteratively, and may occur in real time before, after, or during the performance of Steps C-F.

With reference to FIG. 1, the Collection Manager 10 is a computer module configured to generate one or more client 'collections' or 'sub-collections' including documents authored, maintained, licensed, and/or owned by the client, herein referred to as "internally-held documents". As used herein, the term 'collection' is intended to include a grouping of documents (whether internally-held or external documents) having like parameters or characteristics (herein referred to as the 'collection attributes'). The collection attributes may include, but are not limited to: a) an 'effective date range', b) fulfillment method (i.e., whether a request for documents in the collection are delivered in paper and/or electronic format); c) fulfillment availability and type which includes any special services or options associated with the document, including, but not limited to, an FDA-quality document, a document including a title page, a color document, etc. Each collection has an effective date and an expiration date, wherein the time between the effective date and the expiration date defines the 'effective date range'. The documents contained in a particular collection are only available to the one or more users during the effective date range. According to an embodiment of the present invention, the effective date range may be defined by the term of a contractual agreement between a client and a publisher. For example, if a client signs a one-year contractual agreement with a publisher for access to certain journals, that client may set up a collection with an effective date, expiration date, and effective date range that correspond to the one year period covered by the agreement.

A sub-process includes any grouping of documents which have common collection attributes. Some standard third party collections and sub-collections have collection attributes that are pre-defined/pre-set by a publisher and may be loaded by the Collection Manager 10 into the Document Management System 1 according to the pre-set collection attributes, such as, for example, the Science Direct collection and the collection defined by the CCC's Annual Copyright License (ACL) agreement. In the latter example, if the client may subscribe to CCC's ACL agreement, the Collection Manager 10 is configured to automatically load and update the related collection into the Client Collection 30.

According to an embodiment of the present invention, an internally-held document may include, but is not limited to: 1) a third party published document to which the client has a license or other right, pursuant to a publisher-client contractual arrangement (herein, the 'publisher contract'); and 2) an internally-authored document The internally-held documents represent documents to which the client and its associated users have an valid legal right and/or license to access and/or obtain a copy/copies of the document (i.e., copyright clearance), typically pursuant to the underlying publisher contract which identifies and governs the client's rights in and to the documents along with the terms and conditions relating to the client's use of the document (herein, the 'usage rights'). In addition, the client defines 'access rights' relating to the internally-held documents, wherein the access rights define which users may access a document, collection, and/or sub-collection. For example, the access rights relating to a document may be set such that the document may only be accessed by the entire client, or particular business units, divisions, departments, geographic-locations, practice areas, and/or individuals of the client. The client-defined access rights allow the client to manage and control use of the Document Management System 1.

As shown in FIG. 1, the Document Management System 1 comprises a Rights Engine 20. The Rights Engine 20 is a computer module configured to maintain, manage, review, determine, and control the usage rights and access rights associated with the internally-held documents. The Rights Engine 20 may be communicatively connected to a Contracts Database 25, which is a compilation of all publisher contracts relating to the internally-held documents.

According to an embodiment of the present invention, a publisher contracts may be represented as a collection in the Document Management System 1. The terms and conditions associated with the publisher contract may be entered into the Contracts Database 25 by the client or an individual associated with the Document Management System 1. The documents covered by a particular publisher contract can be entered manually or imported automatically via the Collection Manager 10.

Figure 2:
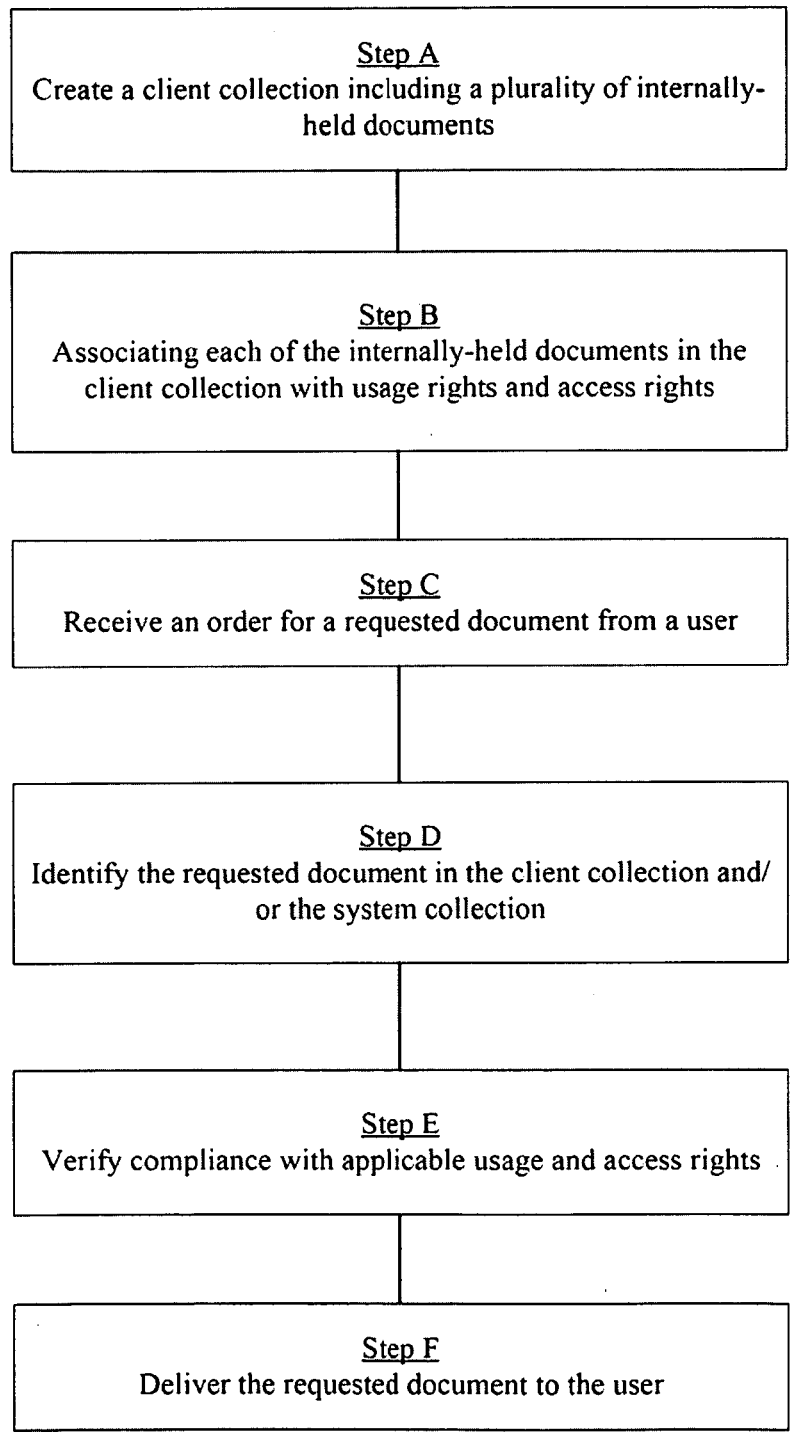
FIG. 2 illustrates a exemplary method for managing documents, according to an one or more embodiments of the present invention.

In Steps A and B shown in FIG. 2, the Collection Manager 10 creates one or more client collections including internally-held documents that may be ordered as individual items through the Document Management System 1. The Collection Manager 10 and the Rights Engine 20 communicate to associate each of the internally-held documents in the client collection with the appropriate usage rights and access rights. The client collections or groups may be configured and arranged according to the access rights and usage rights associated with the collection or the internally-held documents within the client collection.

Figure 3:
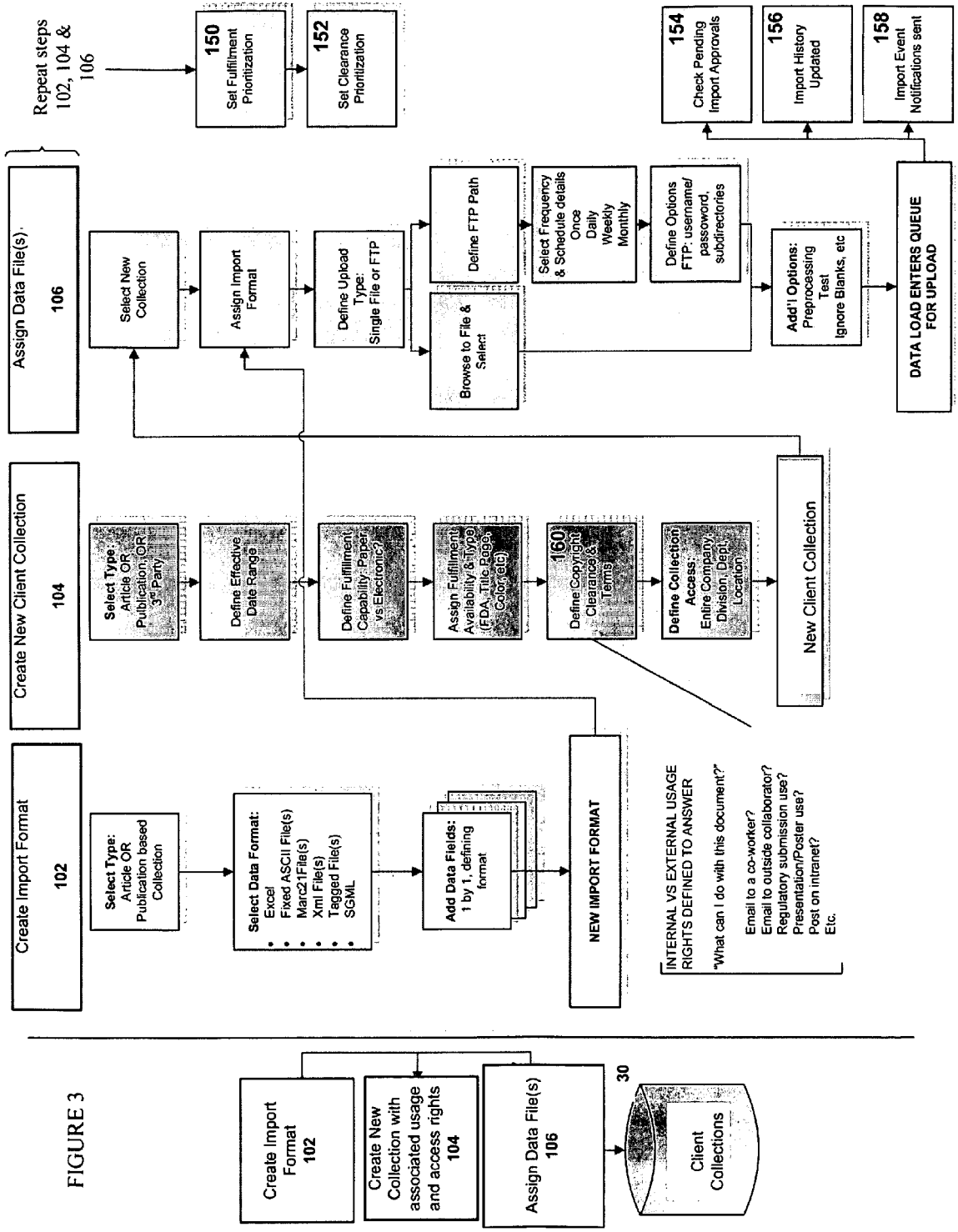
FIG. 3 illustrates a process for creating new collections, according to one or more embodiments of the present invention.

FIG. 3 illustrates a detailed process flow associated with Steps A and B of FIG. 1, in accordance with an embodiment of the present invention. According to an embodiment of the present invention, as shown in FIG. 3, the collection creation process comprises the following sub-processes: creation of an import format 102, establishment of a new collection with defined access rights and usage rights 104, and assignment of one or more data files 106.

In sub-process 102, upon identification of the one or more internally-held documents to be included in a collection, a type of collection is determined. In this sub-process, the collection is categorized into one or more classifications, including, but not limited to, an article collection or a publication-based collection. Next, the data format for the one or more data or file formats are selected for the documents included in the collection. Exemplary data formats selected for the documents include, but are not limited to: Microsoft Excel file format, Fixed ASCII file format, Marc21 file format, XML file format, Delimited file format, Tagged file format, and SGML file format.

According to an embodiment of the present invention, each article or publication is described by a series of data points (for example—an International Standard Serial Number (ISSN), Title, Author, etc.). The "Add Data Fields" box represents the process of mapping each of these data points from a field in the file to the applicable field in the Document Management System 1. For example, a user may use a file (e.g., an Excel spreadsheet) including a list of publications and two data point columns—a first column including a title and a second column that includes an author name. For each publication in the list, the data points in the columns may be mapped to the appropriate 'title' and 'author' fields in the Document Management System 1. Additionally, the data points may be manipulated as desired (i.e., edited, re-ordered, augmented, etc.) in the Document Management System 1.

In sub-process 104, a new collection is created. According to this sub-process, for each new collection to be created, a collection type is selected. Exemplary collection types include, but are not limited to: an article collection, a publication collection, or a third party collection (i.e., a standard collection offered by a publisher which a client can purchase 'as is' such that a new collection need not be specifically created for a given client, but rather a client is provided access to a common, shared pre-existed third party collection). Next, the Collection Generator 10 assigns collection attributes to the collection.

Next, in step 160, the usage rights are associated with the new collection by the Rights Engine 20. The usage rights include, but are not limited to, the terms and conditions related to clearance of the copyright associated with the documents in the collection. Lastly, the Rights Engine 20 establishes and associates the applicable access rights with the collection. The one or more client collections tagged with the usage rights and access rights are stored in the Client Collection 30, a database communicatively connected to the Collection Manager 10. The above-described parameters associated with a new collection are collectively referred to as the 'collection settings'. The Collection Manager 10 may create any number of sub-collections or sub-groups of documents that are stored in the Client Collection 30.

As shown in FIG. 3, sub-process 106 includes the assignment of data files. The assignment of data files begins with the selection of a collection and the assignment of an appropriate import format, established in sub-process 102. Collections and sub-collections that contain the attributes assigned to each data set are highly configurable, depending on how the client licenses the documents from the publishers. Next, an 'upload' type is defined for the collection. The upload type identifies the manner in which the documents are uploaded into the collection. Upload types supported by the Document Management System 1 of the present application include, but are not limited to, any suitable manual or automated file transfer means such as a single file upload or an FTP feed. In the event an FTP upload is selected, an FTP path is defined for the collection, the frequency and schedule details are determined (i.e., how often and when the FTP upload is conducted—e.g., once, daily, weekly, monthly, etc.), and the FTP options are set (i.e., the username, passwords, subdirectories, and other FTP-related attributes are defined). Optionally, additional attributes may be associated with the assigned data files. These attributes may be used to determine how the data is to be treated. For example, the 'Test' option allows for testing of the data import without actually importing the data, thereby permitting a client to determine the validity of the data and the defined format before importing into the system. In another example, the "Ignore Blanks" option serves as a command to the Document Management System 1 to skip blank lines instead of considering them invalid records.

According to an embodiment of the present invention, the new collection with the assigned data file(s) and assigned import format(s) are entered into a queue for upload into the Client Collection 30. Optionally, in step 154, the Collection Generator 10 checks for any pending 'import approvals' for imports which require approval by the client before the import can be performed. This option can be additionally defined to only require approval by the client when a certain number of invalid records are found. When approval is required, the Document Management System 1 runs the import in test mode, determining what the outcome of the actual import would be without importing the data. Next, the Document Management System 1 requests approval from the client. The client may then inspect the results of the test and decide whether to approve the import (and therefore allow the data to actually be imported) or reject it. Next, in optional step 156, the import history is updated and one or more 'import event' notifications are sent, in optional step 158. As used herein, an import event is intended to include, but is not limited to, a means to setup electronic notifications (e.g., an e-mail) to one or more users when certain activity occurs within the Document Management System 1, such as, for example, an "Import Complete" event which calls for the sending of an electronic communication to a user that requested a given import upon completion of the import. This electronic communication may contain various statistics about the import.

According to an embodiment of the present invention, when steps 102, 104, and 106 are repeated resulting in the creation of a plurality of collections. Optionally in step 150, a fulfillment prioritization may be determined for a document which is contained in more than one collection to determine which of the collections is given priority when fulfilling an order. For example, if a particular document referred to as 'document D' is contained in Collection C1 and Collection C2, then Collection C1 may be assigned priority ahead of Collection C2, and the Document Management System 1 will initially attempt to fill a request for document D from Collection C1. If the attempt fails, the Document Management System 1 then attempts to fulfill a request from Collection C2.

Optionally, in step 152, a copyright clearance prioritization is performed. Like the fulfillment prioritization described above, the Document Management System 1 may perform a clearance prioritization wherein for a document subject to more than one copyright restriction, the Document Management System 1 assigns a priority ranking to the two or more applicable copyrights and 'clears' the copyrights in accordance with the priority ranking (i.e., the highest priority copyright is cleared first, etc.).

As shown in FIG. 1, the Document Management System 1 comprises a Document Order Processor 40 communicatively connected to a plurality of users, the Client Collection 30, the System Collection 50, and the Compliance Module 60. The Document Order Processor 40 is a computer module configured to receive an order for a requested document from a user (Step C in FIG. 2), identify the requested document in the Client Collection 30 and/or the System Collection 50 (Step D in FIG. 2), and, following a compliance check, deliver the requested document to the user (Step F in FIG. 2).

Figure 4:
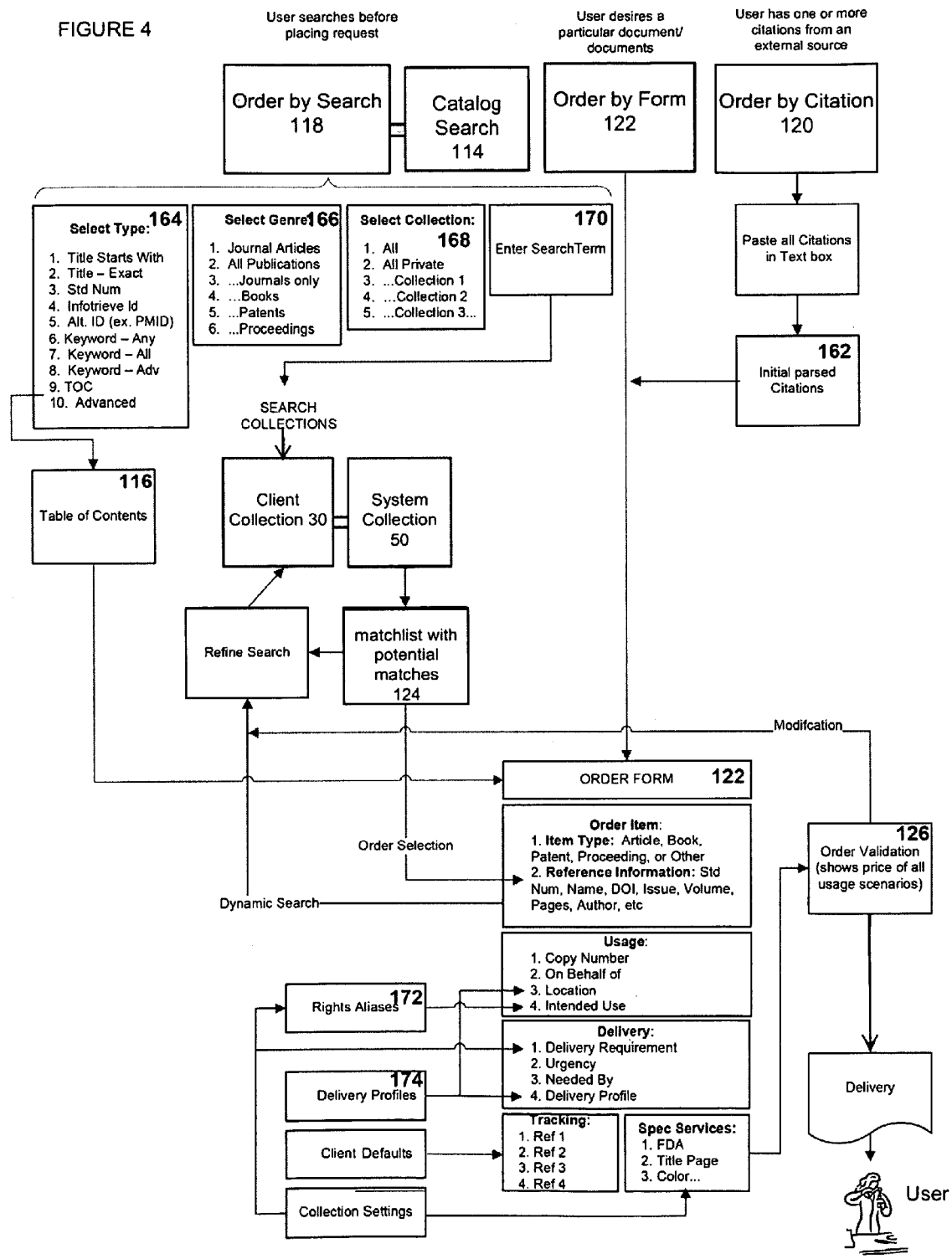
FIG. 4 illustrates an exemplary document ordering process, according to one or more embodiments of the present invention.

FIG. 4 illustrates a detailed process flow associated with Step C of FIG. 1 (i.e., the order placement step), in accordance with an embodiment of the present invention. As shown in FIG. 4, an order for one or more requested documents may be initiated by a user and received by the Document Order Processor 40 via an order by search 118, an order by form 122, and/or an order by citation 120. An order by search 118 may be initiated by a user in instances where the user does not have the details relating to the requested document and wishes to perform a search of the Client Collection 30 and/or System Collection 50 in order to identify the requested document, as shown in Step D of FIG. 2. One having ordinary skill in the art will appreciate that the user may perform a catalog-based search 114.

As shown in operation 164 of FIG. 4, the Document Order Processor 40 determines the method or type used for the document search. Furthermore, operations 166, 168, and 170 involve the definition of various exemplary search criteria/terms. For example, the user may enter one or more specific search terms in operation 170 and the Document Order Processor 40 searches for one or more documents that match those terms in accordance with the type of search selected (in operation 164) and the search limitations imposed (operations 166 and 168). Matching documents are then presented to the user in order of matching relevancy. The user can then select a document and proceed to order it (via the Order Form 122)

According to the order by search 118 sub-process, the Document Order Processor 40 provides the user with a search form including one or more fields designed to illicit information and details concerning the one or more documents the user is seeking. The search form may include one or more fields relating to the search type 164 which identifies the type of search to be performed by the Document Order Processor 40. Exemplary search types 164 for use in accordance with embodiments of the present invention include, but are not limited to, a 'starts with' title search, an 'exact match' title search, a standard number search (e.g., an ISSN, an International Standard Book Number (ISBN), etc.), a search for a unique identifier assigned to a document by the Document Management System 1, a publisher-specific identifier (e.g., a PubMed identifier, a CODEN identifier, etc.), a keyword search, a Table of Contents 116 search, and an 'advanced' search. According to an embodiment of the present invention, the advanced search may include a form having a number of pre-selected fields which are consistent with the document order form 122, described in greater detail below.

According to an embodiment of the present invention, the order form 122 may be populated with information associated with the one or more requested document identified according to any of items or operations 116, 164, 166, 168, or 170.

Next, as shown in FIG. 4, the Document Management System 1 prompts the user to select a category or genre 166 for the desired document(s). Exemplary genres 165 for use in accordance with embodiments of the present invention include, but are not limited to, journals, publications, books, patents, patent publications, papers, proceedings, articles, blogs, electronic mail, newsletters, 'all' (searches the entire Client Collection 30 and/or System Collection 50), 'all' with a qualifying term (e.g., 'all patents'), 'only' with a qualifying term (e.g., 'only journals'). The user may further select one or more collections 168 to be searched and/or base the search on one or more specific search terms. The data compiled by the Document Order Processor 40 in steps 164, 166, 168, and/or 170 is collectively referred to as the 'search logic'.

In Step D of FIG. 1, the Document Order Processor 40 performs a search of the Client Collection 30 and/or System Collection 50 in accordance with the search logic in order to identify the requested document, and returns the results of the search including a list of potential matches 124, herein referred to as the 'matchlist'. The System Collection 50 is a robust computer-based database including a plurality of documents from a variety of publishers and other External Resources 70. According to an embodiment of the present invention, the System Collection 50 may include documents from any suitable source and/or publisher, including, but not limited to: the Thompson ISI print and e-collection database, the ISSN.org database, the Medline database, the PubMed database, the Google Scholar database, etc.

The matchlist 124 is presented to the user and he/she may select one or more entries from the matchlist in order to advance to the next stage of the ordering process. Optionally, the user may review the initial matchlist 124 and further refine his or her search, whereby the refined search logic is used to conduct one or more subsequent searches, until the one or more desired documents are identified. As shown in FIG. 4, upon selection of the requested document(s), the order form 122 is automatically populated with the document information required to complete the order, as described in detail below.

As illustrated in FIG. 4, the Document Order Processor 40 is configured to receive orders initiated by the user via an order form 122. The exemplary order form 122 presented in FIG. 4 includes the following sections to be completed by the user and/or automatically populated by the Document Order Processor 40: 1) a section identifying document order information relating to the requested document(s); 2) a section relating to the user's usage scenario; 3) a section relating to the desired delivery/fulfillment options; 4) a section relating to the tracking of the order; and 5) a section relating to any special services relating to the order that are desired by the user. According to an embodiment of the present invention, the document order information may include, but is not limited to, the title, order type (e.g., article, book, patent, etc.), and/or any other reference or identifying information (e.g., author, issue, volume, pages, std number, name, Digital Object Identifier (DOI), etc.)

According to an embodiment of the present invention, the Document Order Processor 40 is configured to perform Step D in FIG. 2 by searching the Client Collection 30 and/or System Collection 50 using at least a portion of the information provided in section 1 of the order form 122. Optionally, upon identification of a matchlist 124, the user may be iteratively prompted to further refine the initial search, and the refined search logic may be used to conduct one or more subsequent searches until the one or more desired documents are identified.

The usage scenario section of the order form 122 may prompt the user to provide his or her usage scenario information, including, but not limited to, the number of copies requested, the individual or individuals for whom the ordered is placed, a geographic location of the intended recipients of the requested document, and the intended use of the document. According to an embodiment of the present invention, the usage scenario section of the order form 122 may include a pre-configurable list of acceptable usage scenarios from which the user may choose. The list may be adapted by the Document Management System 1 to include usage criteria options that are associated with and directed by the usage rights defined in the contract associated with a requested document.

According to an embodiment of the present invention, the delivery/fulfillment section of the order form 122 allows the user to specify whether the user is already in possession of a copy of the document and is ordering the requisite copyright permission, the urgency level of the order, the method of delivery (i.e., hard-copy and/or electronic format), the intended recipient(s) of the requested document, designation of a pre-configured and customized 'delivery profile' 174 and/or any other suitable delivery attributes. As used herein, the term 'delivery profile' is intended to include, but is not limited to, a set of delivery attributes that may be customized for a particular user such that the profile is selectable for use in the placement of subsequent orders. Optionally, the information contained in the delivery profile 174 may be used to complete portions of the usage scenario, including identifying the user's geographic location. According to an embodiment of the present invention, the special services section of the form may be completed with information included in the collection settings associated with the requested document, as shown in FIG. 4.

As illustrated in FIG. 4, an order by citation 120 may be initiated by a user and received by the Document Order Processor 40. In this scenario, the user may submit one or more document citations (e.g., by copying and pasting a document citation from an external source such as PubMed, OVID, etc.) to the Document Order Processor 40 according to any suitable input mechanism, including, for example, a standard text field. In step 162, the Document Order Processor 40 automatically parses and recognizes the submitted citation(s).

According to an embodiment of the present invention, the Document Order Processor 40 employs a combination of template recognition, pattern matching, recursive 'element' determination and element weighting to extract the desired elements from a typical citation. As used herein, the term "element" is intended to include, but is not limited to, a discrete piece of information that makes up a citation, such as, for example, a Title, Author or Publication Name. The Document Order Processor 40 inspects the citation structure against a set of known citation templates to determine if the citation is one of the known forms. If a match is determined, the citation is parsed according to a parsing algorithm associated with the identified template.

The citation parsing process utilizes a combination of predetermined element placement, specific extraction code, and in some cases where parts of the known template citation are complex, generic processing, as described below. If the Document Order Processor 40 cannot match the citation to a known form, then generic processing is used. Generic processing of a citation is performed by creating a set of 'candidates' (i.e., possible matches or interpretations of the inputted citation), each of which contain a set of weighted elements, and the candidate with the highest combined weight of its elements is selected as the best match.

The process of creating one or more candidates entails a series of steps wherein during each step a particular desired element is identified within the candidate. If in a given candidate a particular element is identified in more than one location, a new candidate is created for each identified element and each of these candidates is processed in the next step. For example, if a given candidate has the following content, "Conference 2005 Notes, January 2006" and the element being identified is the 'date' element, the system would match both "2005" and "January 2006". This would create two candidates with the first indentifying "2005" as the date element and the second identifying "January 2006" as the date element.

According to an embodiment of the present invention, elements are identified by a combination of pattern matching, placement in relation to other known elements and allowable content for the particular element. The element identification process tokenizes the available content based on the element being searched. The tokens are then grouped according to the matching of predefined patterns or allowable content. Each group is then validated as being an acceptable match for the given element, and if valid, considered an identified element. Elements are weighted based on a combination of factors including, but not limited to, the number of tokens in the element, the location of the element within the citation, the location of the element in relation to other known elements in the citation, the location of the element in relation to known special terms in the citation, and the ranking of the template pattern used to determine the element.

An example of the weighting determination described above may include the assignment of a 'higher' weight to an 'author' element if it is near the beginning of the citation versus the end of the citation. In another example, a 'title' element may be weighted based on the number of words in the title. In yet another example, an 'issue' element may be assigned a higher weight if it determined that the issue element is adjacent to a 'volume' element. In another example, a 'date' element in the form of "January 2005" may be weighted higher than a date element in the form of "1 2005". The parsed citations along with user-submitted information are used to complete the order form 122. The Document Order Processor 40 then queries each of the submitted citations.

One having ordinary skill in the art will appreciate that the order form 122 shown in FIG. 4 represents an example of a form suitable for use in accordance with the Document Management System 1, and that alternative sections may be included in the order form 122.

Following identification of the requested document(s) by the Document Order Processor 40, the identified document(s) are reviewed by the Compliance Module 60 to verify compliance with the applicable usage rights and access rights relating to the requested document(s) and/or the user, as shown in Step E of FIG. 2. The Compliance Module 60 is a computer module configured to review the collection or sub-collection to which the requested document belongs and review the associated usage and access rights. According to an embodiment of the present invention, the usage and access rights may be linked to one or more 'rights aliases' 172 which are displayed in the order form 122 for selection by the user at the time of placing the order. The rights aliases 172 present the user with the available usage scenarios associated with the requested document, thereby notifying the user of the permitted uses of the document. The user may then enter his or her intended use consistent with the applicable rights aliases 172.

According to an embodiment of the present invention, the Compliance Module 60 is configured to compare the user and order to the usage and access rights and determine what, if any, additional rights or permissions are required in order to the user to gain access to the requested document. The Compliance Module 60 reviews each requested document on a document-by-document basis to determine the permissions associated with use of the document in Step E of FIG. 2. The review of the applicable permissions associated with a requested document may be based on a number of factors, including, but not limited to the user's identity, the profile of the document being ordered including applicable usage rights including any limitations regarding the usage of the document. The permissions associated with a document are provided by the applicable publisher contract. According to an embodiment of the present invention, the permissions and usage rights derived from the publisher contracts may be extracted and input into the Client Collection 30 and/or System Collection 50 and associated with the profile of a collection and/or individual document. In addition, the Client Collection 30 and/or System Collection 50 may also include the usage rights for the plurality of users associated with the company, such that both the contract-based permissions and user-based usage rights may both be referenced and reviewed during the verification process of Step E. Advantageously, the automated review of the publisher contracts and user usage rights by the Compliance Module 60 allows for an efficient and reliable mechanism for performing copyright clearance and maintaining compliance with existing publisher contracts.

For example, the Compliance Module 60 may review the usage rights (originating from the applicable publisher contract) and determine that the user must purchase a copyright license for the requested document at a copyright fee of $10.00 and limit the number of reproductions the user can make to two (2). The copyright fee and limitations on use are presented to the user prior to the order being finalized, thereby allowing the user to make an informed, cost-conscious purchasing decision.

Optionally, according to an embodiment of the present invention, after the Compliance Module 60 identifies the usage rights and access rights associated with the documents listed in the matchlist, the Document Order Processor 40 may present the user with the applicable usage rights and/or access rights. According to an embodiment of the present invention, the Document Order Processor 40 may provide the user with a mechanism for obtaining and/or purchasing the appropriate rights/permissions necessary for the user to obtain the document, in accordance with the document's usage rights and/or access rights. In order to determine the user's intended use of the document (herein the 'usage scenario'), the order form 122 may include fields designed to illicit information from the user concerning the user's usage scenario. The usage scenario information may include, but is not limited to, the number of copies desired; the name(s), title(s), location(s), or other organizational information relating to the individual or individuals for whom the documents are being ordered; and a description of the intended use.

According to an embodiment of the present invention, having received a completed and compliant order form 122, the Document Order Processor 40 is configured to validate the order 126 and deliver the requested document(s) to the user. In the order validation step, the Document Order Processor 40 displays to the user the possible matches for an item being ordered. Once the user confirms that the item he or she wishes to order is correct (or in the case of multiple matches, the user identifies the desired document), the Document Order Processor 40 calculates and displays pricing information for that item.

FIG. 5 illustrates a number of modules that may optionally be included in the Document Management System 1, according to embodiments of the present invention. As shown in FIG. 5, the optional queues include an Advanced Referencing Queue 134, a Manual Copyright Clearance Queue 136, a Manual Document Identification Queue 138, a Manual Fulfillment Queue 140 and a Manual Delivery Queue 144.

According to an embodiment of the present invention, the Advanced Referencing Queue 134 is a computer-accessible storage configured to store orders wherein special services were requested by the user, orders including incomplete or inaccurate citations, and/or orders for documents that were not located or identified by the Document Order Processor 40. The Advanced Referencing Queue 134 is accessed by a worker and the worker attempts to identify the requested document using one or more tools.

According to an embodiment of the present invention, the Document Management System 1 may comprise a Manual Copyright Clearance Queue 136 wherein orders are placed for which a copyright clearance source cannot be found, either via client collections or system collections. A human operator associated with the Document Management System 1 may review the Manual Copyright Clearance Queue 136, research possible copyright clearance sources for the order and "resolve" the clearance status of the order. There are several possible resolutions for the clearance check including, but not limited to: a) a source of a clearance (i.e., a copyright-compliant provider of the requested document) and associated clearance costs are identified, b) a determination that the document is in the public domain and no copyright clearance is needed, or c) a source can not be identified and the order is cancelled.

According to an embodiment of the present invention, the Document Management System 1 may comprise a Manual Document Identification Queue 138 wherein orders are placed for which a fulfillment source cannot be found, either via client collections or system collections. A human operator associated with the Document Management System 1 may then researches possible sources for the order. If a source is found, the Document Management System 1 provides the document to the user in fulfillment of the order. If a source cannot be found, the order is cancelled.

According to an embodiment of the present invention, the Document Management System 1 may comprise a Manual Fulfillment Queue 140 wherein orders are placed that cannot be filled automatically by the Document Management System 1, but for which a source is known. For example, the Document Management System 1 may be aware of a library that includes the desired document, and, accordingly the Document Management System 1 will place the order in this queue. A human operator may then retrieve the document from the identified library and provide a copy of the document to the Document Management System 1.

According to an embodiment of the present invention, the Document Management System 1 may comprise a Manual Delivery Queue 144 wherein orders are placed that have special delivery requirements, such as the need to be mailed or faxed.

An additional queue referred to as the Order Management queue comprises computer-accessible storage configured to store and present a real-time view of all orders and pending transactions, relating to both internal and external documents, being processed by the Document Management System 1. An administrator of the Document Management System 1 may then review the pending orders and check, cancel, suspend, expedite, modify and/or provide a status update relative to a particular order.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for managing a document delivery program, the method comprising the steps of:

receiving an order for a requested document from a user, wherein the requested document comprises a citation relating to the requested document;

comparing the citation with a set of citation templates;

when there is a match between the citation and at least one of the citation templates in the set of citation templates, parsing the citation in view of the matched citation template to identify at least one candidate document;

when there is no match between the citation and the at least one of the citation templates in the set of citation templates, creating a set of candidate documents, wherein each of the candidate documents in the created set of candidate documents has at least one element of the citation and a corresponding weight assigned to the at least one element of the citation, combining the corresponding weights for each of the elements of the at least one element of the citation and sending the combined corresponding weights for each of the elements of the at least one element of the citation to the user;

selecting, by the user, a candidate document from the identified at least one candidate document or from the created set of candidate documents based on the combined corresponding weights;

determining if the selected candidate document is available in a client collection comprising a plurality of internally-held documents, wherein each of the internally-held documents is associated with usage rights and access rights;

verifying compliance with the usage rights and the access rights associated with the selected candidate document if the selected candidate document is available in the client collection; and delivering the selected candidate document to the user if the selected candidate document has been verified to be in compliance with the usage rights and the access rights.

2. The method of claim 1, further comprising creating the client collection comprising the plurality of internally-held documents, wherein the step of creating the client collection further comprises establishing of collection attributes associated with the created client collection, wherein the collection attributes include at least one of: an effective date range, a fulfillment method, and special services.

3. The method of claim 2, further comprising a step of creating a sub-collection including documents sharing one or more of the collection attributes.

4. The method of claim 1, wherein the order for the requested document is received from the user comprises one of an order by form, an order by search, and an order by citation.

5. The method of claim 1, wherein each of the internally-held documents is associated with the usage rights in accordance with one or more publisher contracts governing use of the internally-held documents and each of the internally-held documents is associated with the access rights defined by a client governing access to the internally-held documents by a plurality of users associated with the client.

6. The method of claim 5, further comprising reviewing the one or more publisher contracts relating to the internally-held documents included in the client collection, and determining applicable terms and conditions relating to use of the internally-held documents.

7. The method of claim 1, further comprising searching the requested document in a system collection comprising a plurality of externally-held documents if the selected candidate document is one of not available in the client collection or has not been verified to be in compliance with the usage rights and the access rights.

8. The method of claim 7, wherein the usage rights comprise one of terms and conditions related to clearance of copyright copyrights associated with the externally-held documents in the system collection.

9. The method of claim 7, further comprising:
retrieving the requested document from the system collection;
delivering the retrieved requested document to the user; and
adding the retrieved requested document to the client collection.

10. The method of claim 1, wherein the at least one element of the citation comprises one of an author, a title, an issue and a date.

11. The method of claim 1, wherein the corresponding weight is assigned to the at least one element of the citation in view of a number of tokens in the at least one element of the citation, a location of the at least one element of the citation within the citation, the location of the at least one element of the citation in relation to another element in the citation, the location of the at least one element of the citation in relation to a term in the citation, and ranking of a template pattern associated with the at least one element of the citation.

12. The method of claim 1, wherein the usage rights comprise one of terms and conditions related to clearance of copyrights associated with the internally-held documents in the client collection.

13. The method of claim 1, wherein the access rights define one or more users that may access the internally-held documents in the client collection, wherein the one or more users comprise one of an entire client, a business unit, a division, departments, a geographic-location, a practice area, and individuals of the client.

14. A computer-implemented document management system comprising:

a collection generator computer module communicatively connected to a client computer system, the collection generator computer module configured to create a client collection comprising a plurality of internally-held documents;

a rights engine computer module communicatively connected to the collection generator computer module, the rights engine computer module configured to associate each of the plurality of internally-held documents in the created client collection with usage rights and associate each of the plurality of internally-held documents in the created client collection with access rights;

a document order processor communicatively connected to one or more users associated with a client, the document order processor configured to receive an order for a requested document from a user from the one or more users, wherein the requested document comprises a citation relating to the requested document, compare the citation with a set of citation templates, when there is a match between the citation and at least one of the citation templates in the set of citation templates, parse the citation in view of the matched citation template to identify at least one candidate document, when there is no match between the citation and the at least one of the citation templates in the set of citation templates, create a set of candidate documents, wherein each of the candidate documents in the created set of candidate documents has at least one element of the citation and a corresponding weight assigned to the at least one element of the citation, combine the corresponding weights for each of the elements of the at least one element of the citation and send the combined corresponding weights for each of the elements of the at least one element of the citation to the user;

select, by the user, a candidate document from the identified at least one candidate document or from the created set of candidate documents based on the combined corresponding weights;

determine if the selected candidate document is available in the created client collection; and a compliance computer module communicatively connected to the document order processor, the compliance computer module configured to verify compliance with the access rights and the usage rights associated with the selected candidate document if the selected candidate document is available in the created client collection, wherein, if the selected candidate document has been verified to be in compliance with the usage and the access rights, the selected candidate document is delivered to the user by the document order processor.

15. The computer-implemented document management system of claim 14, further comprising a client collection database communicatively connected to the collection generator computer module and the rights engine computer module, wherein the client collection database is configured to store the created client collection including the plurality of internally-held documents and the associated access rights and user rights.

16. The computer-implemented document management system of claim 14, wherein the collection generator computer module is configured to create a sub-collection including documents sharing one or more collection attributes.

17. The computer-implemented document management system of claim 14, wherein each of the internally-held documents is associated with the usage rights in accordance with one or more publisher contracts governing use of the internally-held documents and each of the internally-held documents is associated with the access rights defined by a client governing access to the internally-held documents by a plurality of users associated with the client.

18. The computer-implemented document management system of claim 14, wherein the document order processor to search the requested document in a system collection comprising a plurality of externally-held documents if the selected candidate document is one of not available in the created client collection or has not been verified to be in compliance with the usage rights and the access rights.

19. The computer-implemented document management system of claim 18, wherein the document order processor is further configured to retrieve the requested document from the system collection, deliver the retrieved requested document to the user and add the retrieved requested document to the client collection.

20. The method of claim 18, wherein the usage rights comprise one of terms and conditions related to clearance of copyrights associated with the externally-held documents in the system collection.

21. The computer-implemented document management system of claim 14, wherein the at least one element of the citation comprises one of an author, a title, an issue and a date.

22. The computer-implemented document management system of claim 14, wherein the corresponding weight is assigned to the at least one element of the citation in view of a number of tokens in the at least one element of the citation, a location of the at least one element of the citation within the citation, the location of the at least one element of the citation in relation to another element in the citation, the location of the element in relation to a term in the citation, and ranking of a template pattern associated with the at least one element of the citation.

23. The computer-implemented document management system of claim 14, wherein the usage rights comprise one of terms and conditions related to clearance of copyrights associated with the internally-held documents in the created client collection.

24. The computer-implemented document management system of claim 14, wherein the access rights define the one or more users that may access the internally-held documents in the created client collection, wherein the one or more users comprise one of an entire client, a business unit, a division, departments, a geographic-location, a practice area, and individuals of the client.

* * * * *